Patented Apr. 10, 1945

2,373,407

UNITED STATES PATENT OFFICE 2,373,407

AZO COMPOUNDS

James G. McNally and Joseph B. Dickey, Rochester, N. Y., assignors to Eastman Kodak Company, Rochester, N. Y., a corporation of New Jersey No Drawing. Application June 26, 1943, Serial No. 492,444

6 Claims. (Cl. 260—205)

This invention relates to new azo compounds having the formula:

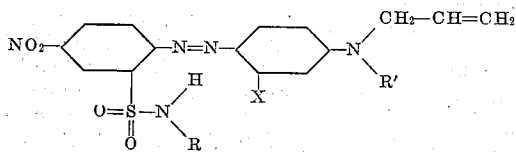

wherein R represents a member selected from the group consisting of a methyl group, an ethyl group, a propyl group, a butyl group, an allyl group, a β-methoxyethyl group, a β-ethoxyethyl group, a β-hydroxyethyl group, a β-hydroxypropyl group and a γ-hydroxypropyl group, R' represents a member selected from the group consisting of a β-hydroxyethyl group, a β-hydroxypropyl group, a γ-hydroxypropyl group, a β,γ-dihydroxypropyl group, a β-methoxyethyl group and a β-ethoxyethyl group and X represents a member selected from the group consisting of hydrogen and a methyl group. This invention also relates to textile materials colored with the aforesaid dyes.

The azo compounds of our invention constitute valuable dyes for coloration of textile materials such as organic derivatives of cellulose, wool, silk, nylon, "Vinyon" and wool-like fibers derived from protein-like materials, such as casein wool. They are particularly of value for the coloration of cellulose acetate. Lacquers composed of cellulose esters, cellulose ethers and vinyl derivatives, for example, also can be colored. Coloration can be effected by dyeing, printing, stencilling or other suitable means.

It is an object of our invention to provide a new class of azo dyes. Another object of our invention is to provide a process for the coloration of organic derivatives of cellulose, wool, silk, nylon and "Vinyon" textile materials. A further object is to provide colored textile materials which possess good fastness properties and which are readily discharged. A specific object is to provide colored cellulose acetate textile materials which have good fastness and dischargeability properties. Other objects will appear hereinafter.

Typical organic derivatives of cellulose include the hydrolyzed as well as the unhydrolyzed cellulose organic acid esters such as cellulose acetate, cellulose formate, cellulose propionate or cellulose butyrate and the hydrolyzed as well as the unhydrolyzed mixed organic acid esters of cellulose such as cellulose acetate-propionate, cellulose acetate-butyrate and the cellulose ethers such as methyl cellulose, ethyl cellulose or benzyl cellulose.

The dyeings obtained with the dye compounds of our invention are characterized by exceptional light fastness and by good fastness properties to gas fumes, washing and perspiration. Further, the dye compounds of our invention possess good affinity for the textile materials named and can be applied rapidly thereto at relatively low temperatures. The advantages of the dye compounds appear to be realized to their greatest extent when cellulose acetate is the material to be colored.

The azo compounds of our invention can be prepared by diazotizing compounds having the formula:

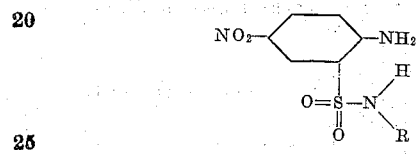

wherein R has the meaning previously assigned to it and coupling the diazonium compounds obtained with the compounds having the formula:

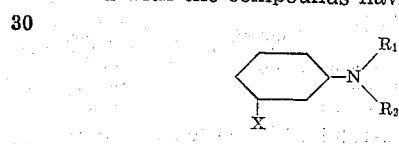

wherein $R_1$, $R_2$ and X have the meaning previously assigned to them.

The following examples illustrate the preparation of the azo compounds of our invention.

Example 1

500 cc. of sulfuric acid (95–96%) were placed in a five-liter flask fitted with a stirrer and thermometer. 76 g. of sodium nitrite (dry) were added slowly with stirring over a period of 1 minute. The temperature of the sulfuric acid rose to 70° to 75° C. After the addition of the nitrite, the temperature fell to 60° C. and the reaction mixture was stirred until a clear solution of nitrosyl sulfuric acid obtained. The solution was cooled to 12° to 14° C. and 1200 g. of acetic acid were added slowly with stirring keeping the temperature at about 20° C. The resulting mixture was cooled to 15° C. and 245 g. (1.0 mole) of 2-amino-5-nitrobenzenesulfonethylamide were added simultaneously with 1 kg. of acetic acid, keeping the temperature at 15° C. The resulting mixture was stirred until solution was complete and then for about an additional hour. The mixture was poured into five liters of ice and water and the precipitated diazonium complex (yellow) was filtered off and washed well with water.

207 g. (1 mole) of allyl glycerylaniline were dissolved in two liters of acetic acid and the diazonium complex was added to the solution with stirring. The resulting mixture was stirred for 12 hours. Water was then added to precipitate the azo dye which was filtered off, washed with water and dried. The azo dye had the following formula:

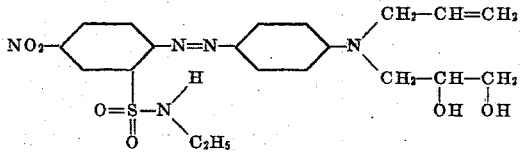

It colored cellulose acetate pinkish-rubine shades which were fast to light. The term glyceryl as used herein is equivalent to the term $\beta,\gamma$-dihydroxypropyl.

Example 2

231 g. (1 mole) of 2-amino-5-nitrobenzene sulfonmethylamide was diazotized with nitrosyl sulfuric acid exactly in Example 1. The diazonium complex was coupled with 221 g. (1 mole) of allyl glyceryl-m-toluidine exactly as in Example 1. The resulting azo dye had the following formula:

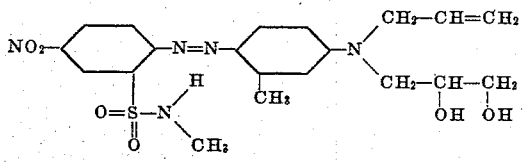

It dyed cellulose acetate pinkish-rubine shades, fast to light.

Example 3

257 g. (1 mole) of 2-amino-5-nitrobenzenesulfonallylamide was diazotized with nitrosyl sulfuric acid exactly as in Example 1. The diazonium complex was coupled with 207 g. (1 mole) of allyl glycerylaniline exactly as in Example 1. The resulting azo dye had the following formula:

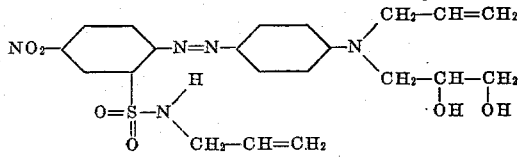

Example 4

261 g. (1 mole) of 2-amino-5-nitrobenzenesulfon-$\beta$-hydroxyethylamide was diazotized with nitrosyl chloride exactly as in Example 1. The diazonium complex was coupled with 207 g. (1 mole) of allyl glycerylaniline as in Example 1. The resulting azo dye had the following formula:

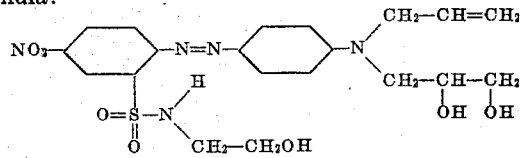

It dyed cellulose acetate pinkish-rubine shades, fast to light.

The following tabulation further illustrates the compounds included within the scope of our invention together with the color they produce on the textile materials named herein. The compounds indicated below may be prepared by diazotizing the amines listed under the heading "Amine" and coupling the diazonium compounds obtained with the compounds in the column entitled "Coupling component." The diazotization and coupling reactions may, for example, be carried out following the general procedure described in Examples 1 to 4, inclusive.

| | Amine | Coupling component | Color |
|---|---|---|---|
| 1 | 2-amino-5-nitro-benzenesulfonethyl-amide | Allyl-$\beta$-hydroxyethyl-m-toluidine | Pink. |
| 2 | 2-amino-5-nitro-benzenesulfon-n-butyl-amide | Allyl-$\beta$-hydroxyethyl aniline | Do. |
| 3 | ....do.... | Allyl glyceryl-m-toluidine | Pinkish-rubine. |
| 4 | ....do.... | Allyl-$\beta$-hydroxyethyl-m-toluidine | Pink. |
| 5 | 2-amino-5-nitro-benzene sulfon-$\beta$-methoxyethylamide | Allyl glyceryl aniline | Pinkish-rubine. |
| 6 | ....do.... | Allyl glyceryl-m-toluidine | Do. |
| 7 | 2-amino-5-nitro-benzenesulfonmethyl-amide | Allyl-$\beta$-hydroxyethyl aniline | Pink. |
| 8 | ....do.... | Allyl-$\beta$-hydroxypropyl aniline | Do. |
| 9 | ....do.... | Allyl-$\beta$-methoxyethyl aniline | Do. |
| 10 | ....do.... | Allyl $\beta$, $\gamma$-dihydroxypropyl m-toluidine | Pinkish-rubine. |
| 11 | ....do.... | Allyl $\gamma$-hydroxypropyl m-toluidine | Do. |
| 12 | 2-amino-5-nitro-benzenesulfonethyl-amide | Allyl-$\beta$-hydroxyethyl aniline | Pink. |
| 13 | ....do.... | Allyl-$\beta$-hydroxypropyl aniline | Do. |
| 14 | ....do.... | Allyl-$\beta$-methoxyethyl aniline | Do. |
| 15 | ....do.... | Allyl $\beta$, $\gamma$-dihydroxy-propyl m-toluidine | Pinkish-rubine. |
| 16 | ....do.... | Allyl $\gamma$-hydroxypropyl-m-toluidine | Do. |
| 17 | 2-amino-5-nitro-benzenesulfonallyl-amide | Allyl $\beta$-hydroxyethyl aniline | Pink. |
| 18 | ....do.... | Allyl $\beta$-$\gamma$-dihydroxypropyl m-toluidine | Pinkish-rubine. |
| 19 | ....do.... | Allyl $\gamma$-hydroxypropyl m-toluidine | Do. |
| 20 | 2-amino-5-nitro-benzene sulfon-$\beta$-hydroxyethylamide | Allyl $\beta$-hydroxyethyl aniline | Pink. |
| 21 | ....do.... | Allyl $\beta$, $\gamma$-dihydroxy-propyl m-toluidine | Pinkish-rubine. |
| 22 | ....do.... | Allyl $\gamma$-hydroxypropyl m-toluidine | Do. |
| 23 | 2-amino-5-nitro-benzene sulfonethyl-amide | Allyl $\beta$, $\gamma$-dihydroxypropyl aniline | Do. |
| 24 | 2-amino-5-nitro-benzenesulfonmethyl amide | Allyl $\beta$, $\gamma$-dihydroxypropyl aniline | Do. |
| 25 | 2-amino-5-nitro-benzenesulfonallylamide | Allyl $\beta$, $\gamma$-dihydroxypropyl aniline | Do. |
| 26 | 2-amino-5-nitro-benzene sulfon $\beta$-hydroxyethyl amide | Allyl $\beta$, $\gamma$-dihydroxypropyl aniline | Do. |

It will be understood that the foregoing examples are illustrative and not limitative of the invention as any of the diazonium compounds indicated herein can be coupled with any of the coupling components indicated herein. Again, while it is not specifically stated in the examples that the dyes described therein are suitable for the coloration of textile materials other than cellulose acetate they are good dyes for the textile materials disclosed herein.

Compounds having the formula:

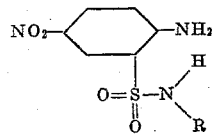

wherein R has the meaning previously assigned to it can be prepared as indicated by the following equations:

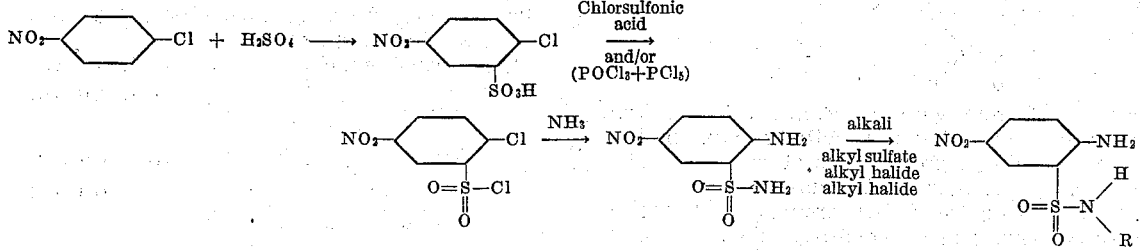

Similarly, these compounds can also be prepared by the following indicated process steps.

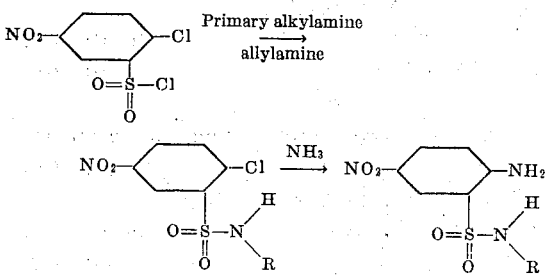

Any other suitable methods can be employed.

In the first series of equations, it will be understood that the amount of alkylating or allylating agent used determines whether one or both of the hydrogen atoms of the sulfonamide group is replaced by an alkyl or allyl group. In the present instance only sufficient alkylating or allylating agent necessary to replace one hydrogen atom should be used.

2-amino-5-nitrophenylsulfonamide, 2-amino-5-nitrophenylmethylsulfonamide, 2-amino-5-nitrophenylethylsulfonamide and other similar type compounds can be prepared by the general method described by P. Fischer, Berichte der Deutschen Chemischen Gesellschaft, vol. 24, page 3790 (1891). The coupling components used in the preparation of the azo dye compounds of our invention can be prepared by methods known to those skilled in the art. From the foregoing, the preparation of the components used in the manufacture of the azo dye compounds will be clear to those skilled in the art.

It is here noted that the term nylon refers to a linear polyamide resin which is believed to basically be described or claimed in U. S. Letters Patent 2,071,250, issued February 16, 1937, to Wallace H. Carothers. The term "Vinyon" refers to a vinyl chloride-vinyl acetate copolymer. This material is more completely identified, at pages 73 and 74 of "Synthetic Organic Chemicals," 10th edition, published October 15, 1940, by Carbide & Carbon Chemicals Corporation.

The azo compounds of our invention are, for the most part, relatively insoluble in water and, accordingly, they may be advantageously directly applied to the material undergoing coloration in the form of an aqueous suspension which can be prepared by grinding the dye to a paste in the presence of a sulfonated oil, soap or other suitable dispersing agent and dispersing the resulting paste in water. In some instances, the dye may possess sufficient solubility in water as to render the use of a dispensing agent unnecessary. Generally speaking, however, the use of a dispersing agent is desirable.

Direct dyeing operations can, with advantage, be conducted at temperatures of about 75°–85° C. but any suitable temperature may be used. Thus, the textile material to be dyed or colored is ordinarily added to the dyebath at a temperature lower than that at which the main portion of the dyeing is to be effected, a temperature approximating 45°–55° C., for example, following which the temperature is raised to that selected for carrying out the dyeing operation. The temperature at which the dyeing is conducted may, of course, be varied somewhat depending upon the particular material undergoing coloration. As is understood by those skilled in the art, the intensity of dyeing can be varied by varying the proportion of dye to material undergoing coloration. Generally speaking, 1–3% by weight of dye to material is employed although any desired proportions can be used.

Suitable dispersing agents together with the amounts that may be employed are disclosed in our Patent No. 2,115,030, issued April 26, 1938. The process disclosed in this patent for the dyeing of cellulose acetate silk can be used in applying the dyes of the present application to this material.

It will be understood that the other textile materials named hereinbefore can be directly colored from an aqueous dyebath in a similar manner as cellulose acetate silk. However, other suitable methods for the dyeing of these materials are known to those skilled in the art and these methods, of course, can be used in applying the dye compounds of this application if desired. We would further note that, while colors yielded by the dye compounds have been given primarily with reference to cellulose acetate silk, generally similar colors are ordinarily obtained on the other materials.

This application is a continuation-in-part of our copending application, Serial No. 426,056, filed January 8, 1942, now Patent No. 2,347,704.

What we claim as our invention and desire to be secured by Letters Patent of the United States is:

1. The azo compounds having the formula:

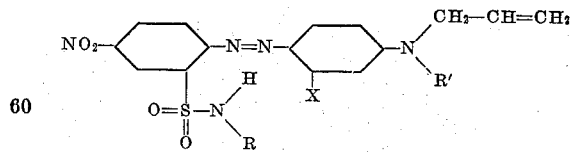

wherein R represents a member selected from the group consisting of a methyl group, an ethyl group, a propyl group, a butyl group, an allyl group, a β-methoxyethyl group, a β-ethoxyethyl group, a β-hydroxyethyl group, a β-hydroxypropyl group and a γ-hydroxypropyl group, R' represents a member selected from the group consisting of β-hydroxyethyl group, a β-hydroxypropyl group, a γ-hydroxypropyl group, a β, γ-dihydroxypropyl group, a β-methoxyethyl group and a β-ethoxyethyl group, and X represents a member selected from the group consisting of hydrogen and a methyl group.

2. The azo compounds having the formula:

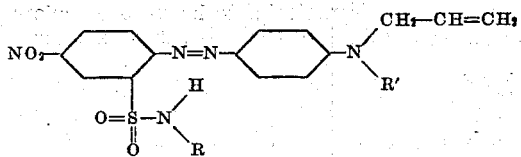

wherein R represents a member selected from the group consisting of a methyl group, an ethyl group, a propyl group, a butyl group, an allyl group, a β-methoxyethyl group, a β-ethoxyethyl group, a β-hydroxyethyl group, a β-hydroxypropyl group and a γ-hydroxypropyl group, R' represents a member selected from the group consisting of β-hydroxyethyl group, a β-hydroxypropyl group, a γ-hydroxypropyl group, a β,γ-dihydroxypropyl group, a β-methoxyethyl group and a β-ethoxyethyl group.

3. The azo compounds having the formula:

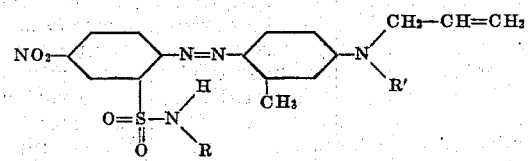

wherein R represents a member selected from the group consisting of a methyl group, an ethyl group, a propyl group, a butyl group, an allyl group, a β-methoxyethyl group, a β-ethoxyethyl group, a β-hydroxyethyl group, a β-hydroxypropyl group and a γ-hydroxypropyl group, R' represents a member selected from the group consisting of β-hydroxyethyl group, a β-hydroxypropyl group, a γ-hydroxypropyl group, a β,γ-dihydroxypropyl group, a β-methoxyethyl group and a β-ethoxyethyl group.

4. The azo compound having the formula:

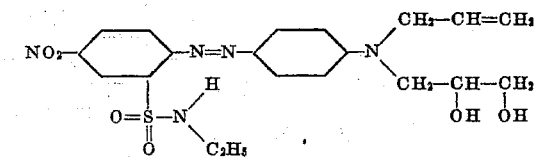

5. The azo compound having the formula:

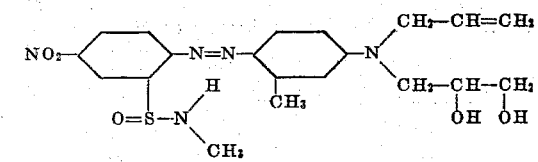

6. The azo compound having the formula:

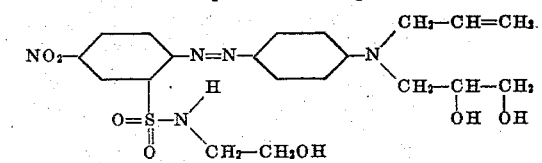

JAMES G. McNALLY.
JOSEPH B. DICKEY.